United States Patent [19]

Wisfeld et al.

[11] 3,779,909
[45] Dec. 18, 1973

[54] METHOD OF AND APPARATUS FOR THE PURIFICATION OF WATER CONTAINING ORGANIC CONTAMINANTS

[75] Inventors: Werner Wisfeld, Frankfurt Am Main; Hans Wirth, Dortelweil; Walter Lotz; Alfred Kratz, both of Frankfurt Am Main, all of Germany

[73] Assignee: Laboratorium Fur Adsorptionstechnik GmbH, Frankfurt/Main, Germany

[22] Filed: July 22, 1971

[21] Appl. No.: 165,281

[30] Foreign Application Priority Data
Oct. 10, 1970 Germany............... P 20 49 919.8

[52] U.S. Cl.................. 210/29, 210/40, 210/64
[51] Int. Cl............... C02b 1/14, C02b 1/36
[58] Field of Search.............. 210/17, 18, 29, 33, 210/39, 40, 62, 63, 150, 151, 290, 24, 27, 28, 64

[56] References Cited
UNITED STATES PATENTS

| 3,377,271 | 4/1968 | Cann | 210/18 X |
|---|---|---|---|
| 3,017,347 | 1/1962 | Kratz | 210/63 |
| 3,448,045 | 6/1969 | Hess et al. | 210/63 |
| 3,244,621 | 4/1966 | Bouthilet | 210/33 X |
| 799,605 | 9/1905 | Lester | 210/63 X |
| 2,366,917 | 1/1945 | Levine | 210/17 |
| 2,992,986 | 7/1961 | Ingram | 210/17 |
| 3,296,122 | 1/1961 | Karassik et al. | 210/18 X |

Primary Examiner—Samih N. Zaharna
Assistant Examiner—Thomas G. Wyse
Attorney—Karl F. Ross

[57] ABSTRACT

Water containing organic contaminants is treated with an oxygen-containing gas and thereafter passed through a biologically effective active-carbon stage divided into at least two activated-carbon beds for biodegradation of the microorganisms in the raw water. Between these beds at least a major proportion of the water emerging from the first bed is treated with ozone before entering the next bed. The two beds constitute a biological purification stage from which the effluent may be passed to an adsorption stage in which activated carbon is used to remove residual organic impurities by contact absorption. The final effluent is chlorinated with at least 0.05 mg/liter chlorine or treated with an equivalent quantity of another disinfectant.

8 Claims, 2 Drawing Figures

METHOD OF AND APPARATUS FOR THE PURIFICATION OF WATER CONTAINING ORGANIC CONTAMINANTS

FIELD OF THE INVENTION

Our present invention relates to a method of the purification of water containing organic contaminants and, more particularly, to a method of recovering water suitable for drinking and substantially free from microorganisms, using organically contaminated water as a source.

BACKGROUND OF THE INVENTION

Numerous methods of purifying water have been proposed and with increasing contamination of surface or spring water, subterranean or well water and even water derived from reservoirs, some purification is required. For example, it is known to aerate such water, to chlorinate or to treat the water with other disinfectants, to filter the water and/or to subject the water to biological decontamination by treatment with an activated sludge for degradation of organic impurities. Other methods have, of course, also been used but have been found to be less successful than the aforementioned techniques which may be used individually or in combination.

All of these systems have, in common, the desire to produce a bacillus-free, germ-free or bacteria-free water or water completely free from pathogenic microorganisms and containing only limited quantities of nonpathogenic microorganisms (less than 100 microorganism particles/cm$^3$ of water). Water fulfilling these requirements can be pumped into a municipal or other distribution network and is characterized as adequate drinking water or hygienically satisfactory drinking water.

In practice, however, this water is not always displaced or discharged from the network at a rate sufficient to prevent buildup of microorganisms and even transformation of nonpathogenic microorganisms into pathogenic species. Thus, while the total microorganism count of the water introduced into the network may be at most 100/cm$^3$, in relatively short periods the microorganism count may increase to many times this value.

To limit, prevent or delay microorganism multiplication within the water-supply network, the disinfectants mentioned above, especially chlorine, have been introduced. However, the chlorine introduced into the water may not reach all of the water in the network to break the microorganism-growth cycle. Furthermore, the amount of chlorine or other disinfectant which must be supplied to insure limitation of the microorganism reproduction process generally exceeds 0.5 mg/liter and is detrimental to the taste and other properties of the drinking water.

It has been proposed heretofore to reduce the microorganism count in drinking water before it is introduced into the network by subjecting the water to a biological process involving breakdown and eventual precipitation of the microorganisms. Organically contaminated water, for example, may be treated with strong oxidizing agents, such as ozone and chlorine (the latter forming hypochlorite upon introduction into the water) to oxidize the microorganism, destroying pathogenic species and permit agglomeration of the organic residue such that it may be settled or sedimented from the water or removed by filtration. Typical filter systems include activated carbon with a specific loading of, for example, $\Sigma = 10$ hr$^{-1}$. For the purposes of the present invention, and in accordance with conventional practices, the specific loading $\Sigma$ is defined as the liquid volume traversing the filter divided by the product of the activated-carbon volume and time in hours or $$\Sigma = L/C \cdot hr$$

where L is the liquid volume, C is the activated-carbon volume and hr represents time in hours. After such treatment, chlorination at a level of 0.5 mg/liter is nevertheless required to prevent microorganism multiplication in the water-supply network.

It is also known, especially in cases in which the microorganism count is low, to pass the water through an activated-carbon filter in which the absorptive capacity of the activated carbon is exploited to remove, by surface adhesion, part or all of the organic contaminents. None of the aforementioned systems are fully satisfactory. On the one hand, they require considerable quantities of chlorine or other disinfectants which may be detrimental to the taste and water quality. On the other hand, they may be insufficiently able to prevent microorganism development in the water-supply network. Finally, the process may be so lacking in economy as to preclude anything but academic interest in them.

OBJECTS OF THE INVENTION

It is the principal object of the present invention to provide an improved method of purifying organically contaminated water, especially for the production of drinking water whereby the aforementioned disadvantages are obviated.

It is another object of the present invention to provide an improved method of producing drinking water from surface water (surface runoff, river, stream or lake water), subterranean water and, in general, organically contaminated water from any source whereby the water resulting from the method can be introduced without difficulty into a water-supply network.

It is a further object of the invention to provide an apparatus or plant for producing drinking water of improved quality as specified above.

Still another object of the invention resides in the provision of a method of producing hygienically clean, good-tasting water which may remain in the distribution network for long periods without material change in the microorganism count.

SUMMARY OF THE INVENTION

These objects and others which will become apparent hereinafter, are attained in accordance with the present invention with a method of treating organically contaminated water, especially surface or subterranean water, prior to the passage of the treated water into a distribution network, which comprises subjecting the organically contaminated water in the presence of oxygen introduced in gaseous form into the water, to a biological breakdown upon an activated-carbon bed with a specific loading of less than 4 hrs $^{-1}$ ($\Sigma < 4$ hr$^{-1}$) and thereafter treating the effluent with at least 0.05 mg/liter of chlorine (at most 0.5 mg/liter) or an equivalent amount of another disinfectant, the treating of the water upon the activated carbon for biological decontamination is carried out in at least two stages (at least two beds) such that the water is oxygenated with oxygen-containing gases prior to entering into the first bed and at least the major proportion of the effluent from the first bed is ozonized prior to entry into the second bed. The effluent from the second bed is chlorinated as indicated.

We have discovered, most surprisingly, that this combination of treatment steps affords a substantial improvement in the quality of the effluent introduced into the water supply network of a municipality or the like. Apparently, the process depends upon a preliminary biological oxidizing degradation of organic contaminants upon the two biologically active active-carbon beds which have no significant adsorption function because of the indicated minimum specific loading. In other words, the first and second activated-carbon beds of the present invention, operated with the aforementioned minimum specific loading, act as biological decontaminated stages in which breakdown of the contaminating microorganisms is carried out and the major portion of the organic contaminants is removed. Preferably, the specific loading ranges between $\Sigma = 3$ to $1$ $hr^{-1}$ and the biological decontamination stage is followed by a mechanical decontamination stage in which the water is filtered.

According to an important aspect of this invention, the chlorination is carried out with substantially less than 0.5 mg/liter of chlorine and preferably with 0.1 to o.3 mg of chlorine. Proportions of chlorine in excess of 0.3 mg/liter have been found to be undesirable. It has been pointed out that the chlorine, upon introduction into water, dissociates to form hypochlorite which apparently is the active species in the oxidation breakdown of the organic contaminants. When we refer to amounts of other disinfectants equivalent to a stated amount of chlorine, therefore, we mean the oxidizing equivalent of the effective hypochlorite produced upon chlorination. A typical disinfectant other than chlorine which can be used is chlorine dioxide. The activated-carbon beds of the biologically active stage, according to the present invention, have a macropore volume of more than 0.5 $cm^3/g$ and a BET surface in excess of 200 $m^2/g$ preferably in excess of 500 $m^2/g$.

Advantageously, the two beds are of different particle size, i.e., are composed of activated-carbon particles of different average particle size or particle-size range. Preferably, the first bed makes use of larger activated-carbon particles, advantageously in a size range of 1.5 to 5 mm with best results being obtained at 2 to 4 mm. The second bed may have a particle size range of 0.5 to 2.5 mm, preferably 0.7 to 1.5 mm. However, within the indicated ranges, the average particle size of the first bed should exceed the average particle of the second bed. In addition, we may note that the total bed height to obtain a specific loading of less than 4 $hrs^{-1}$, preferably 3 to 1 $hr^{-1}$, will be 2 to 6 meters. Each bed may be subdivided into strata of progressively smaller particle size within the indicated ranges and, preferably, strata of smaller particle size are of greater height. Similarly, when a total height of 6 meters for both of the biologically active beds is required, the height ratio of the first bed to the second may range between 1:1 to 1:2.5, preferably about 1:2. Hence, the first bed may have a height of 2 meters whereas the second bed may have a height of 4 meters. The reverse situation is also possible as noted below.

The initial treatment of the water with an oxygen-containing gas, according to the invention, may be effected by passing air or oxygen-enriched air countercurrent to the water through a trickle tower, whereupon the oxygenated water is passed through the first bed. The aeration and the biological decontamination on the activated-carbon beds can be carried out at elevated pressure (preferably 3 to 5 atmospheres gauge). Following the biological decontamination of the water on the activated-carbon beds, we prefer to filter the water through one or more activated-carbon beds operating primarily under adsorption principles and having little, if any, capability for biological decontamination. Prior to entry of the raw water into the system of the present invention, we may add flocculating agents to promote settling or sedimentation when colloidally dispersed impurities are present. The presence of impurities of larger particle size may call for mechanical filtration. The filter bed or beds, subsequent to the biological disinfecting stage tend to become contaminated by particles of precipitated organic matter which can be removed by conventional backwashing.

The ozoning gas stream, which preferably is employed to treat the major portion of the effluent from the first biological decontamination stage, may be constituted by atmospheric air or oxygen-enriched air containing ozone produced by any conventional process, e.g. electrical discharge. Where ozonization is highly effective, the dimensions of the activated-carbon beds serving for biological decontamination can be reduced. In other words, the overall height of 6 meters mentioned earlier may be reduced by, for example, reducing the height of the second bed to, say, 2 meters. We have found that best results are obtained when the raw water is treated with oxygen-containing gas prior to entry into the first biological decontamination bed and this gas stream is free from ozone, i.e., ozonization is carried out only after an initial biological decontamination with oxygen-enriched or atmospheric air. The first stage thus removes readily oxidized or decomposed impurities while the more difficultly oxidizable or decomposable impurities are reacted with ozone in the subsequent stage. An advantage of this process resides in the fact that expensive or difficult-to-produce ozone is not consumed in the treatment of substances which can easily be removed by simple oxygen oxidation.

So that the bacterioflora in the second biological decontamination stage is not disturbed, it has been found to be advantageous to carry out the process so that all of the ozone is consumed and is effective in the reaction. To this end, we provide a storage stage or receptacle in which the ozone-treated water remains for a reaction time of 2 to 5 minutes prior to passing onto the second biological decontamination bed. In place of such a reaction stage, we may use a further activated-carbon layer of small volume designed to ensure complete reaction of the ozone with the water before it enters the second biological decontamination bed. We have also found that a minimum microorganism content is advantageous for the reaction of the water in the second stage and hence we bypass a minor proportion of the water from the first stage to the second stage without ozonization, this proportion being from 2 to 20 percent of the effluent from the first biological decontamination stage. The adsorptive activated-carbon filter downstream of the biological decontamination portion of the installation may, of course, sustain some biological breakdown of the organic material within the effluent from the second biological decontamination stage.

According to still another feature of the invention, the adsorption filter bed is continuously or intermittently regenerated by thermal techniques known in the art. We prefer to withdraw the filter bed from a portion of the filter at the water-inlet side of the apparatus which is most highly contaminated and to operate the system so that the filter bed moves in counterflow to the water. Two such filter beds may be provided in a single unit or in separate units or in tandem, with the regenerated activated carbon being introduced into the last or downstream filter bed while the activated carbon to be regenerated is drawn from the first upstream filter bed.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
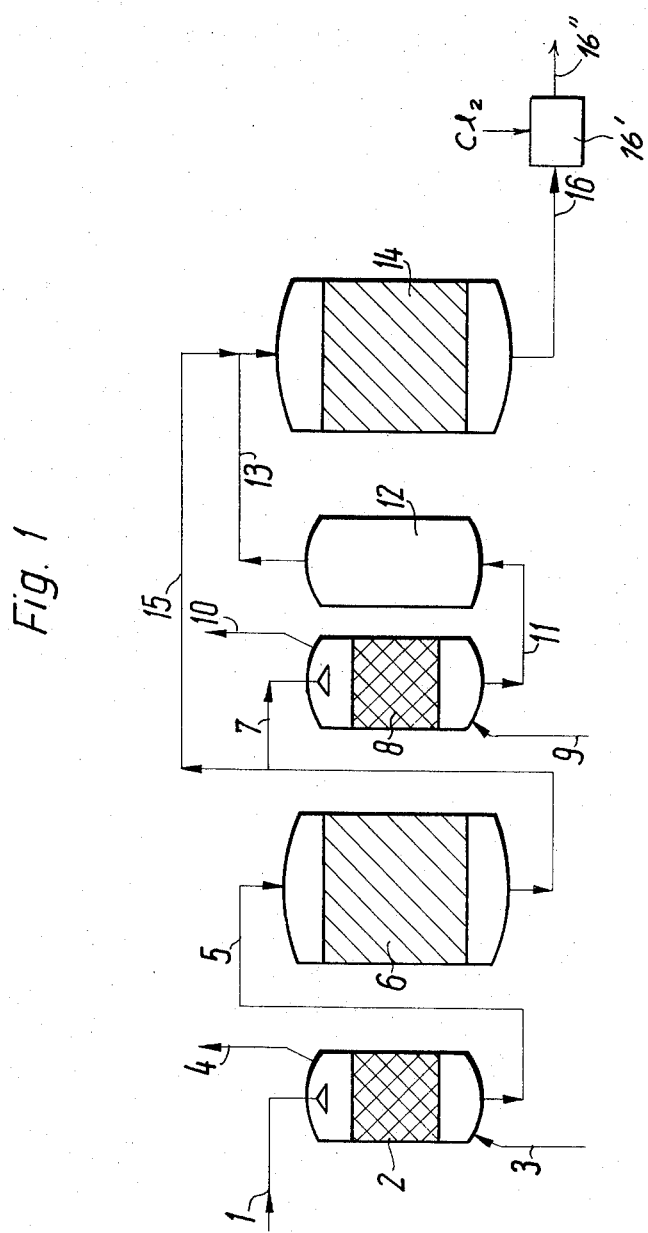
FIG. 1 is a flow diagram according to one embodiment of the invention wherein a single filter bed is provided.

In FIG. 1 of the drawing, we show a water-purification plant which comprises a trickle tower 2 into which the raw water, following sedimentation, mechanical filtration or even activated-sludge treatment, is fed at 1. The oxygen-containing gas stream is introduced at 3 and passes countercurrent to the raw water to emerge at 4.

The oxygen-treated water is conducted via duct 5 into the first biological decontamination stage 6 filled with activated carbon and operated, as already noted, with a specific loading $\Sigma$ of less than 4 hrs$^{-1}$. The readily precipitated, decomposed and agglomerated organic particles accumulate upon the bed 6 so that a partially purified first-stage effluent is delivered at 7 to a trickle tower 8 through which an ozone-containing gas stream is passed at 9 and 10 countercurrent to the first-stage effluent. The second-stage influent treated with ozone, is passed into a storage vessel 12 with a residence time of 2 to 5 minutes and is then delivered at 13 to the second activated-carbon bed of the biological decontamination system. A minor proportion of 2 to 20 percent of the first-stage effluent is bypassed via line 15 to the activated-carbon bed 14. In this embodiment, no activated-carbon filter is provided at the downstream end of the system and the second-stage effluent, substantially freed from microorganism particles, is led at 16 to a chlorinating device 16' before being fed at 16'' into the water supply network.

Figure 2:
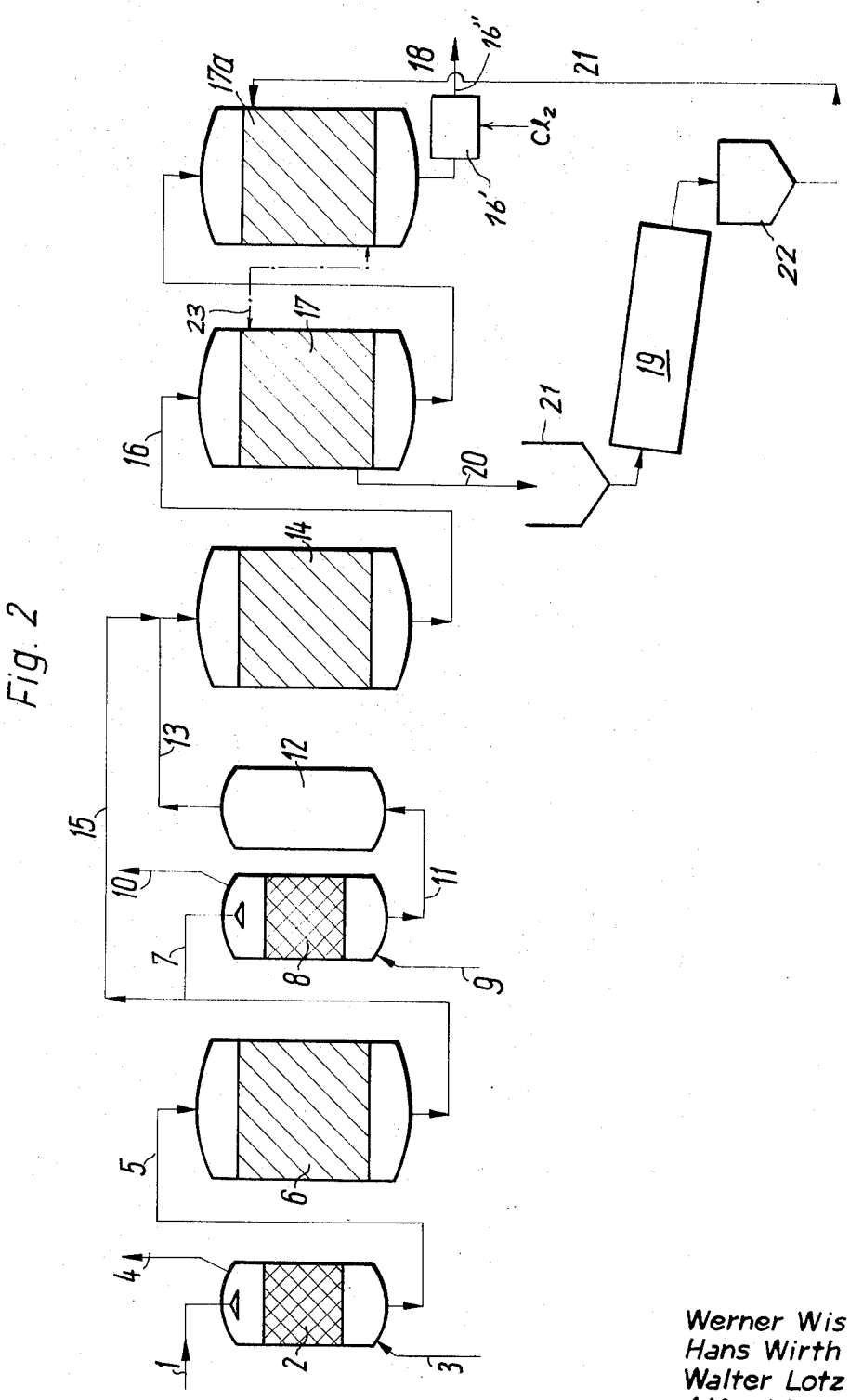
FIG. 2 is a flow diagram of another embodiment wherein a plurality of activated-carbon filters are provided at the downstream end of the installation.

In the embodiment of FIG. 2, line 16 delivers the second-stage effluent to a first adsorption filter 17 charged with activated carbon, the effluent from this filter being fed to a further filter stage 17a likewise using activated carbon. The final purified water is delivered to the chlorinator 16' and supplied to the water network as represented at 16''.

The activated carbon of filter 17 is continuously or intermittently transferred at 20 to a hopper 21 and thence into a rotary kiln 19 heated to the reactivation temperature of the activated carbon in accordance with conventional techniques. The activated carbon may be stored at 22 and is continuously or intermittently returned to the downstream filter 17a. The activated carbon in the latter may be transferred to the upstream filter as represented by line 23. In other words, the activated carbon of the filter stage 17, 17a passes in counterflow to the water during purification.

SPECIFIC EXAMPLES

Example I

River water with an organic content corresponding to a potassium permanganate value of 45 mg/liter and $NH_4^+$ value of 1.2 mg/lit is treated in an apparatus as illustrated in FIG. 1. The permanganate value is defined as the number of milligrams of solid potassium permanganate per liter of the raw water as titrated with 0.1 N $KMnO_4$ to the first appearance of the permanganate coloration.

The water is aerated in the trickle tower 2 with atmospheric oxygen to saturation and is thereupon introduced into the activated-carbon bed 6 containing activated-carbon with a particle size of 3 mm (average), having a specific loading of 2 hrs$^{-1}$, a BET surface of 600 m$^2$/g and a macropore volume above 0.5 cm$^3$/g. The bed had a height of about 4 meters.

The effluent had a $KMnO_4$ value of 25 mg/liter and was ozonized with ozone-containing air to an oxygen content of 21 mg/liter at the discharge side of chamber 8.

The water was then introduced into the receptacle 12 for a period of 2 to 5 minutes and thereupon supplied to the activated-carbon bed 14 which had the characteristics of bed 6 except for an average particle size of 2 mm. The residence time in stage 14 was about 25 minutes. About 10 percent of the nonozonized effluent from stage 6 was fed directly to stage 14. The water drawn at 16 from the apparatus had a $KMnO_4$ value of 8.7 mg/liter and was disinfected with 0.1 mg/liter chlorine.

Example II

Surface water with a $KMnO_4$ value of 62 mg/liter and a $NH_4^+$ content of 1.2 mg/liter is treated in the system of FIG. 2 to produce drinking water. A raw water is oxygenated in the aeration vessel 12 and introduced into the biological decontamination stage 6 containing activated carbon with a particle size in the range of 2.4 mm and other characteristics essentially as given in Example I. After a residence time of 12.5 minutes in stage 6, the effluent is found to have a $KMnO_4$ value of 40 mg/liter. After ozonization, as described in Example I, the major proportion of the first stage effluent, after a residence time of 4 minutes in vessel 12, is supplied to stage 14 and remains therein for a residence time of 12.5 minutes. The particle-size range in stage 14 is 1 to 3 mm and the activated-carbon bed has otherwise the characteristics already described. The effluent at stage 14 has a $KMnO_4$ value of 19 mg/liter and there is no trace of $NH_4^+$.

The water is then led to the adsorption filters 17 and 17a which have a particle size of 0.5 to 1 mm for a residence time in both filters of 15 minutes total. The final effluent has a $KMnO_4$ value of 4.0 mg/liter and disinfected with 0.05 mg of chlorine. Thermal regeneration of the activated carbon at 17 and 17a is carried out continuously with a complete replacement of the activated carbon with regenerated carbon each 30 to 90 days.

We claim:

1. A method of transforming ground/and or surface water containing organic contaminants into drinking water, comprising the steps of:
   a. treating ground or surface water without any prior addition of disinfectant, with an oxygen-containing gas and passing the treated ground or surface water through a first activated-carbon bed having particles in a size range of 1.5 to 5 mm for partial removal of organic contaminants to produce a first effluent;
   b. treating at least a major portion of said first effluent with ozone and thereafter eliminating residual ozone from said major portion prior to further treatment thereof;
   c. passing the ozone-treated portion of said first effluent in step (b), after elimination of residual ozone, through a second activated-carbon bed having particles in a size range of 0.5 to 2.5 mm to remove further quantities of organic contaminants and produce a second effluent, said beds having a specific loading of less than 4 $hrs^{-1}$ and being not regenerated, the average size of the particles of the first bed being greater than the average size of the particles of the second bed; and
   d. disinfecting said second effluent with the disinfecting equivalent of at least 0.05 and not more than 0.5 mg/liter of chlorine.

2. The method defined in claim 1 wherein said major portion of said effluent is treated in step (b) with an ozone and oxygen-containing gas stream.

3. The method defined in claim 2 wherein the ozone-treated portion of said first effluent from step (b) is retained for a period of 2 to 5 minutes in a reaction vessel prior to step (c).

4. The method defined in claim 2 wherein the ozone-treated portion of said first effluent is contacted with an activated-carbon bed prior to step (c) to eliminate excess ozone.

5. The method defined in claim 2, further comprising the step of branching a minor portion of said first effluent directly to step (c) without intervening ozonization.

6. The method defined in claim 2, further comprising the step of passing said second effluent prior to disinfection through an activated-carbon adsorption filter.

7. The method defined in claim 6, further comprising the step of continuously regenerating the activated carbon of said adsorption filter.

8. The method defined in claim 7 wherein the activated carbon of said adsorption filter is passed countercurrent to the second effluent traversing same.

* * * * *